(12) United States Patent
Bartoli

(10) Patent No.: US 6,444,160 B1
(45) Date of Patent: Sep. 3, 2002

(54) APPARATUS AND METHOD FOR BLOW MOULDING TWO THERMOPLASTIC SHEETS WITH THE USE OF PNEUMATIC OPERABLE MEMBRANES WHICH CLOSE THE MOULD HALFS

(75) Inventor: Andrea Bartoli, Reggio Emilia (IT)

(73) Assignee: Unfill International A/G, Kreuzlingen (CH)

( * ) Notice: Subject to any disclaimer, the term of this patent is extended or adjusted under 35 U.S.C. 154(b) by 0 days.

(21) Appl. No.: 09/147,980

(22) PCT Filed: Sep. 16, 1997

(86) PCT No.: PCT/EP97/05074
§ 371 (c)(1),
(2), (4) Date: Jul. 17, 2000

(87) PCT Pub. No.: WO98/13191
PCT Pub. Date: Apr. 2, 1998

(30) Foreign Application Priority Data

Sep. 24, 1996 (IT) ......................................... MO96A0121

(51) Int. Cl.⁷ ............................................... B29C 51/38
(52) U.S. Cl. ........................ 264/545; 425/389; 425/503; 425/541
(58) Field of Search ................................. 425/389, 503, 425/530, 541; 264/545, 527, 530; 156/292, 285, 382, 500

(56) References Cited

U.S. PATENT DOCUMENTS

| | | | | |
|---|---|---|---|---|
| 3,158,089 A | * | 11/1964 | Fillol | 425/389 |
| 3,537,138 A | * | 11/1970 | Brown et al. | 425/541 |
| 3,809,739 A | * | 5/1974 | Gelin | 425/389 |
| 3,829,264 A | * | 8/1974 | Mnilk et al. | 425/541 |
| 3,833,333 A | * | 9/1974 | Britten | 425/389 |
| 4,793,121 A | * | 12/1988 | Jamison | 425/389 |
| 5,223,073 A | * | 6/1993 | Freddi et al. | 425/503 |
| 5,411,391 A | * | 5/1995 | Albrecht et al. | 425/541 |
| 5,486,103 A | * | 1/1996 | Meiring et al. | 425/541 |
| 5,770,003 A | * | 6/1998 | Tabaroni et al. | 425/503 |

FOREIGN PATENT DOCUMENTS

| | | | |
|---|---|---|---|
| EP | 565916 A1 | * | 10/1993 |
| EP | 692364 A1 | * | 1/1996 |
| EP | 692428 A1 | * | 1/1996 |
| WO | WO-94/08852 A1 | * | 4/1994 |

* cited by examiner

Primary Examiner—Robert Davis
(74) Attorney, Agent, or Firm—Reising, Ethington, Barnes, Kisselle, Learman & McCulloch, P.C.

(57) ABSTRACT

An apparatus comprising first fluid supplying means for supplying inflating fluid to between opposite portions of thermoformable material, first and second parts for receiving said portions between them, one of the parts being in the form of a shell defining a recess having a surface against which said inflating fluid presses one of said opposite portions driving means operable to bring the shell into a closed conditions relative to the other part and to maintain the shell in said closed condition, and second fluid supplying means arranged to supply operating fluid to said driving means, wherein the driving means and the second fluid supplying means are pneumatic. A method comprising providing first and second parts one of which is in the form of a shell, supplying operating fluid to driving means to translate the shell towards the other part, with opposite portions of thermoformable material being received between the first and second parts, to bring the shell into a closed condition relative to the other part, and supplying an inflating fluid to between said opposite portions to inflate said opposite portions while said driving means maintains said shell in said closed condition, wherein the operating of said driving means to bring the shell into said closed condition and to maintain the shell in said closed condition in pneumatic.

25 Claims, 4 Drawing Sheets

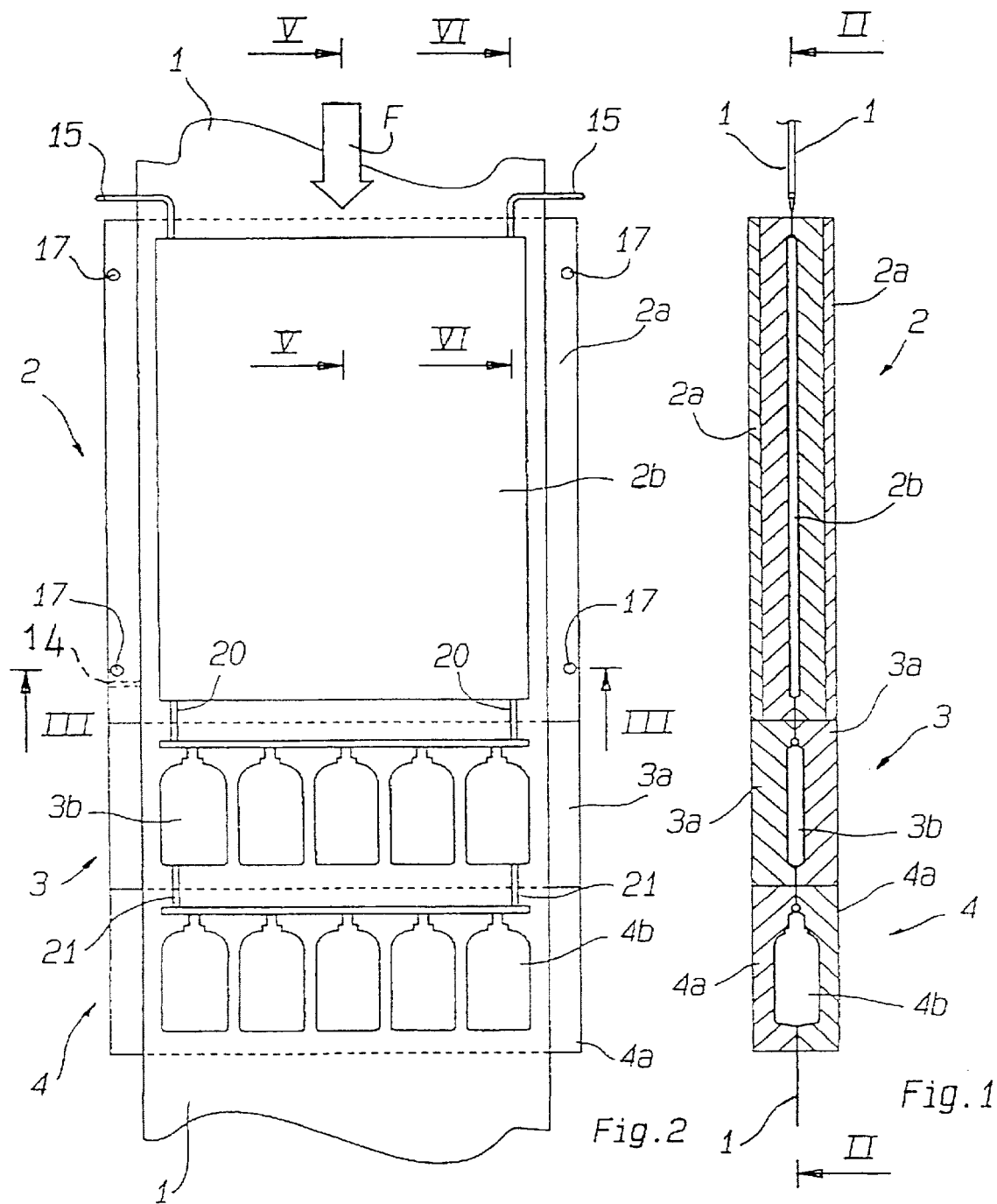

APPARATUS AND METHOD FOR BLOW MOULDING TWO THERMOPLASTIC SHEETS WITH THE USE OF PNEUMATIC OPERABLE MEMBRANES WHICH CLOSE THE MOULD HALFS

The invention concerns an apparatus and a method for inflating thermoformable material.

A known type of heating apparatus, such as shown in WO-A-94/08852, comprises heaters between which a pair of string at a pre-heating station of thermoformable material is inserted and indexed, the strips being heated to predetermined temperatures by contact with surfaces of heating blocks of the heaters. In the apparatus of this type, an intermediate heating block is provided, interposed between the pair of strips, the intermediate heating block receiving heat by radiation from the external heaters. Consequently, control of the temperature of the intermediate heating block is difficult and there is a tendency to overheat. After the pre-heating station is a heat-sealing station for heating and welding the pair of strips, comprising a pair of mould shells having respective recesses facing each other, thermally coupled with heating means and translated by driving means to close on the pair of strips and heat then while a pneumatic fluid is injected to between the strips by suitable injecting means. The injection of the pressurized fluid serves to prevent the hot central parts of the strips from contacting each other and undesirably welding together during, or after, heating. The pressure of the fluid which is injected between the strips is transmitted to the surfaces of the recesses and, in turn, the shells transmit the forces to their respective supporting plates through respective driving means in the form of cams and followers. Thus, the driving force counterbalancing the inflating pressure is concentrated over a relatively small area and therefore the areas of those portions of the strips which are to be heated cannot be excessive otherwise the fluid would exert extremely high forces on the shells which could damage the heat-sealing station. This tends to limit the productivity of the system. After the heat-sealing station is a pneumatic forming station to which the pneumatic fluid is supplied through grooves extending from the recesses in the shells of the heat-sealing station to recesses in a pair of shells of the forming station.

U.S. Pat. No. 3,829,264 discloses a blow-moulding apparatus for thermoplastic material and including a mould having two relatively movable mould sections. One or both of the mould sections are mounted on carriers for relative movement, and adjusting means in the form of springs or in the form of a bladder extensible by pressure fluid is interposed between at least one of the mould sections and its associated carrier so that the mould sections can be adjusted relative to each other and aligned in parallelism. The mould sections are mounted upon respective arms turnable about a common axis by driving means in the form of oppositely acting pressure-fluid motors.

In U.S. Pat. No. 3,245,197, the system includes a thermoforming station at which two strips have formed therein respective rows of cavities, followed by a welding and filling station at which the outlines of the pairs of cavities are welded together except at filling openings and the containers thus obtained are filled. The welding and filling station is followed by a closing station at which the filling openings are sealed. At the thermoforming station is a stationary mould member which is wedge-shaped and has its two opposed inclined mould faces facing towards respective mould faces of two turnable mould members. The stationary member has compressed air outlet apertures opening through its opposed inclined faces to supply jets of air to force the sheets into contact with the mould faces of the turnable members. Electrical heaters may be provided in the stationary member to keep the strips at the proper temperature for pressure moulding. The strips may be pre-heated at respective heating stations preceding the thermoforming station. Each turnable member is pivotally mounted on a rod. During indexing of the strips through the stations, the turnable members extend vertically downwards from the respective rods. At the end of each step of advance of the strips, the turnable members are swung into fluid-tight contact with the strips and clamp them against the stationary member. For swinging the movable members to-and-fro, they are pivotally connected to respective, horizontal, hydraulic piston-and-cylinder devices.

According to one aspect of the present invention, there is provided apparatus comprising first fluid supplying means for supplying inflating fluid to between opposite portions of thermoformable material, first and second parts for receiving said portions between them, one of the parts being in the form of a shell, said shell defining a recess having a surface against which said inflating fluid presses one of said opposite portions, driving means operable to translate the shell towards the other part, with said portions between the first and second parts, to bring the shell into a closed condition relative to the other part and to maintain the shell in said closed condition against the inflating pressure of the inflating fluid, and second fluid supplying means arranged to supply operating fluid to said driving means, characterized in that the driving means and the second fluid supplying means are pneumatic.

According to second aspect of the present invention, there is provided apparatus comprising first fluid supplying means for supplying inflating fluid to between opposite portions of thermoformable material, first and second parts for receiving said portions between them, one of the parts being in the form of a shell, said shell defining a recess having a surface against which said inflating fluid presses one of said opposite portions, driving means operable to translate the shell towards the other part, with said portions between the first and second parts, to bring the shell into a closed condition relative to the other part and to maintain the shell in said closed condition against the inflating pressure of the inflating fluid, said driving means including an operating chamber having an operating surface, and second fluid supplying means arranged to supply operating fluid to said operating chamber to translate said operating surface and thus said shell towards said other part, characterized in that the projected areas of said surface of said recess and of said operating surface are of substantially the same size as each other.

According to a third aspect of the present invention, there is provided a method comprising providing first and second parts one of which is in the form of a shell, supplying operating fluid to driving means to operate said driving means to translate the shell towards the other part, with opposite portions of thermoformable material being received between the first and second parts, to bring the shell into a closed condition relative to the other part, and supplying an inflating fluid to between said opposite portions to inflate said opposite portions while said driving means serves to maintain said shell in said closed condition, characterized in that the operating of said driving means to bring the shell into said closed condition and to maintain the shell in said closed condition is pneumatic.

The use of pneumatic fluid as compared with hydraulic fluid has the advantages that the pneumatic fluid is compressible and that, since in most cases in practice, the inflating fluid would be pneumatic fluid, the operating fluid can often be taken from the same source as the inflating fluid, thus considerably simplifying the apparatus. The arrangement whereby the projected area of the surface of the recess is of substantially the same size as the projected area of the operating surface has the advantage that the driving force can be spread over at least the projected area over which the inflating force is spread.

In a preferred embodiment of the invention, a heating apparatus for heating a pair of strips of thermoformable material comprises a pair of shells having recesses facing each other, the shells being thermally coupled with temperature varying means and driven by pneumatic driving means to close on the pair of strips and heat them while pneumatic inflating fluid is injected between the strips by injecting means in order to keep the strips mutually spaced apart and in contact with the respective internal surfaces of the pair of shells, the operating fluid acting in a direction opposite to the direction of the force exerted by the inflating fluid, the projected area acted on by the operating fluid being at least substantially equal to the projected area acted on by the inflating fluid, and a support for the driving means extending over an area at least substantially equal to the projected area acted on by the operating fluid. Thus, since the shell can bear against the driving means over a considerable area and since the driving means can bear against a fixed support over a considerable area, it is possible for those portions of the strips which are to be heated between the shells also to extend over a considerable area.

Owing to the invention, it is possible to increase considerably the productivity of a blow-thermoforming apparatus for forming containers, because an increase of the internal surfaces of the shells—which allows the heating of strip portions having considerable areas—even if it involves an increase in the inflating force exerted on the shells, can be easily compensated for. Moreover, it is relatively simple to heat materials which are particularly difficult to heat, for example polypropylene, because a single heating station can extend for a plurality of indexing pitches.

BRIEF DESCRIPTION OF THE DRAWINGS

One embodiment of the invention is shown, purely by way of example, in the accompanying drawings, wherein:

FIG. 1 is a schematic longitudinal section through a blow-thermoforming apparatus for thermoforming a pair of strips, the section being taken in a plane orthogonal to a plane containing the strips;

FIG. 2 is a section taken along line II—II of FIG. 1;

Figure 3:
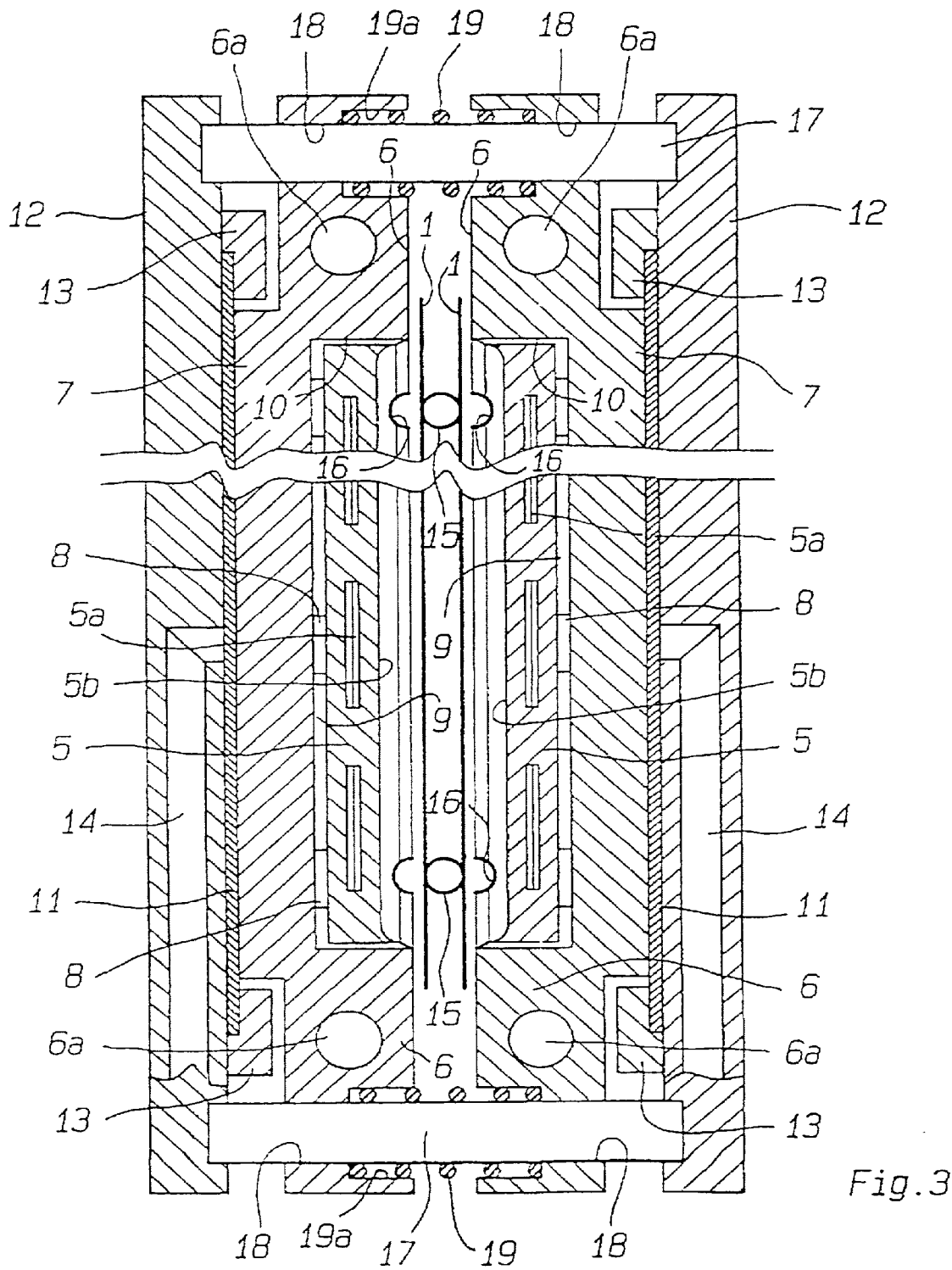
FIG. 3 is a section taken mainly along line III—III of FIG. 2, showing heating plates open end non-deformed strips.

Referring to the drawings, the apparatus for thermoforming a pair of strips 1 which are indexed in the direction of the arrow F, comprises, in succession, a heating station 2, a heating and welding station 3 and a forming station 4: in each of the stations 2, 3 and 4 the pair of strips 1 is closed between respective pairs of shells 2a, 3a and 4a which are internally provided with respective cavities 2b, 3b and 4b into which a pressurized inflating fluid, for example compressed air, is injected. The cavities 3b and 4b define the outline and the shape of the containers which are blow-thermoformed from the pair of strips 1. In particular the cavities 3b are shallower than the cavities 4b; thus, the material of the strips 1 is subjected to progressive deformation.

The heating and welding station 3 and the forming station 4 can be analogous to those described in WO-A-94/08852; however, the forming apparatus is not limited to an apparatus of that particular character; in fact one or more other stations can be envisaged downstream of the heating station 2, for example similar to those described in EP-A-0692428, or EP-A-0692364.

As shown particularly in FIG. 2, the cavity 2b extends over almost the entire extension of the heating station 2 and is internally provided with a pair of heating plates 5 (FIG. 3), each of which is peripherally closely encircled by a frame 6 which is cooled by a suitable cooling fluid circulating in conduits 6a.

Each heating plate 5 is internally provided with heating elements in the form of electrical resistors 5a and is fixed to a driving plate 7 by spacing elements 8, in such a way that a thermic separation between the heating plate 5 and the frame 6 is maintained.

Each frame 6 forms a peripheral projection of the plate 7 towards the strips 1 and bounds internally a hollow 10 in which the heating plate 5 is received.

The spacing elements 8 form, internally of each hollow 10, an air gap 9 between the heating plate 5, on the one hand, and the frame 6 and the plate 7, on the other hand, such that the transmission of heat from the heating plate 5 to the frame 6 and the plate 7 is deterred.

Centrally attached to each plate 7 is an elastic membrane 11 which is peripherally fixed to a supporting plate 12 by frame-shaped peripheral fixing means 13; the elastic membrane 11 acts on that major surface of the plate 7 further from the spacing elements 8. Each supporting plate 12 is provided with a conduit 14 leading, at one end, to an operating chamber 22 delimited by the membrane 11 and the plate 12, and connected, at its other end, to feeding means for a pressurized operating fluid, for example compressed air.

Figure 4:
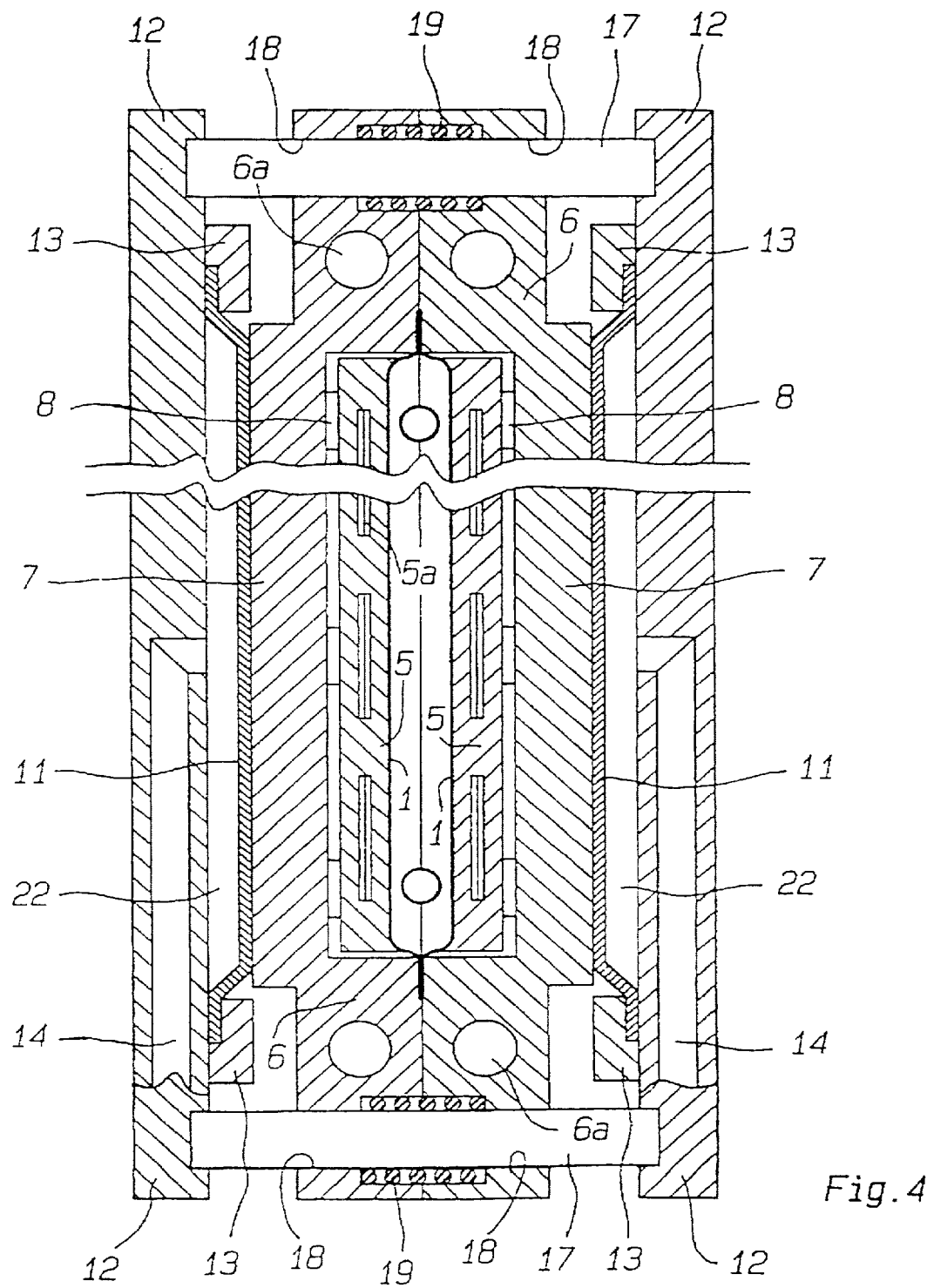
FIG. 4 is a section as in FIG. 3, but with the plates closed and the strips deformed.
Figure 5:
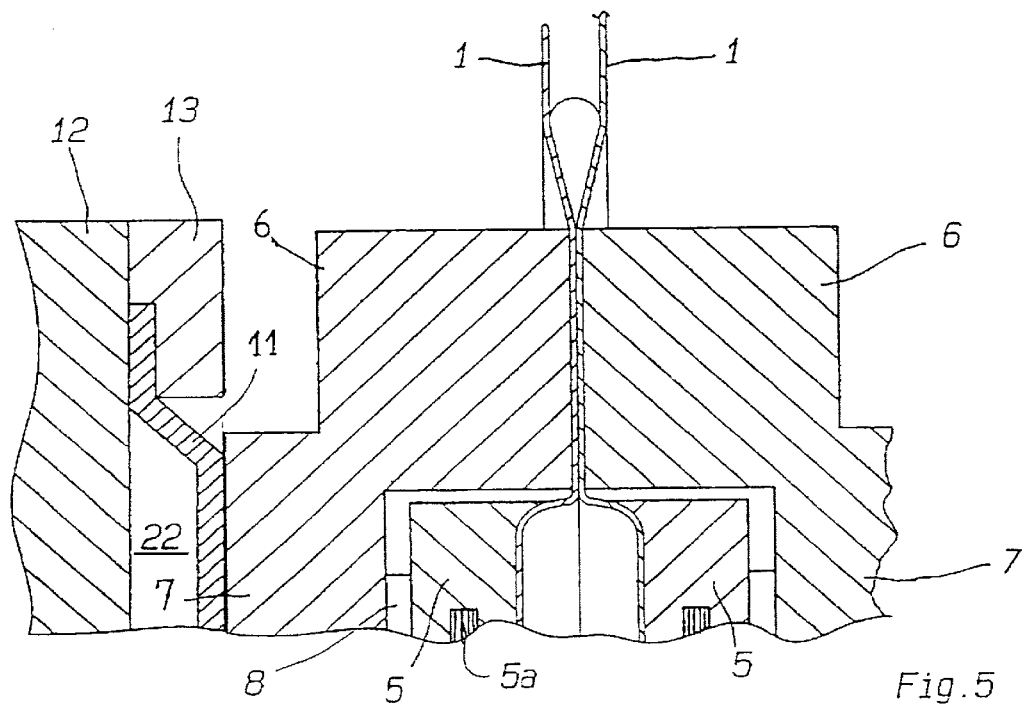
FIG. 5 is a fragmentary, enlarged section taken along line V—V of FIG. 2.
Figure 6:
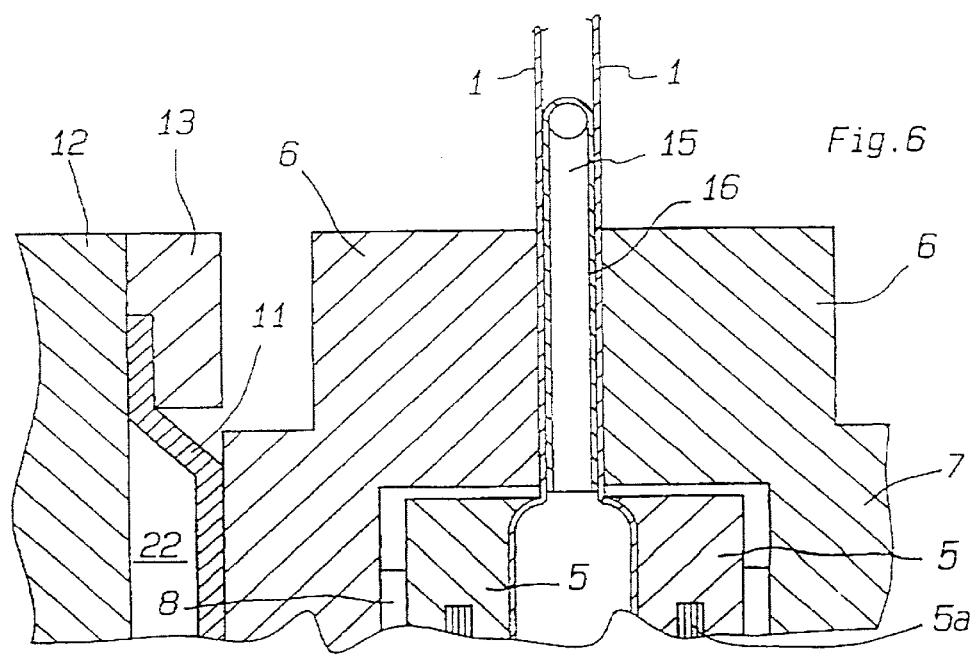
FIG. 6 is a fragmentary, enlarged section taken along line VI—VI of FIG. 2.

A comparison of FIGS. 3 and 4 shows that, when the conduits 14 of the pair of supporting plates 12 are fed with pressurized fluid, the fluid, by deformation of the pair of membranes 11, shifts the frames 6 towards the pair of strips 1 until the strips 1 are peripherally closed between the frames 6; at the same time also the heating plates 5 are moved to close to the pair of strips 2, which begin to warm up. Inward movement of each plate 7 is produced by the injection of the pressurized fluid through the conduit 14, since this causes the membrane 11 to leave the adjacent surface of the supporting plate 12, so creating the chamber 22.

Pressurised inflating fluid is injected by injection means 15, located at that edge of the frames 6 furthest from the heating and welding station 3. The injection means 15, for example constituted by a pair of injectors, is received in corresponding pairs of notches 16 (FIG. 3) of the frames 6, with interposition of the strips 1, the notches being sufficiently deep to prevent the injection means from obstructing the closing of the pair of frames 6 on the pair of strips 1. The injection of the inflating fluid by the injection means 15 produces inflation of respective portions of the strips 1 until those portion bear against the surfaces 5b of respective recesses of the heating plates 5 and receive heat from these.

The effective area of each membrane 11 is chosen in such a way that, for a predetermined feeding pressure of the operating fluid, the closing force which is exerted on the pair of plates 5 and 7 is at least sufficient to counterbalance the force which is exerted, in an opposite direction, by the inflating fluid.

The supporting plates 12 are interconnected by guide means 17, for example two pairs of rods which are sliding fits in corresponding holes 18 in the frames 6. Moreover, return means are provided to restore the initial mutual position of the plates 7 when pressure of the operating fluid in the conduits 14 is decreased. Such return means may comprise helical springs 19 encircling the rods 18 and received in respective seats 19a in the frames 6.

That edge of the pair of frames 6 nearest the heating and welding station 3 and the adjacent edge of the station 3 are provided with notches 20, in such a way that air from the injection means 15 can feed also the station 3 by way of conduits formed between the pair of strips 1 in the notches 20. Further notches 21 provided in the opposite edge of the heating and welding station 3 and in the adjacent edge of the forming station 4 allow, analogously, the inflating of the containers by means of the fluid from the injection means 15. The notches 20 and 21 thus constitute connections between the cavity 2b and the cavities 3b and between the cavities 3b and the cavities 4b.

The peripheral edges of the heating plates 5 are set back at a certain distance into the respective frames 6, in such a way that, when the pair of shells 2a closes on the pair of strips 1, those edges do not contact each other and therefore do not tend to cut the strips. Thus, a pair of opposite strip portions is obtained which is homogeneously heated over substantially all of its surface and peripherally connected to a pair of non-deformed and non-heated edge zones, at which the pair of strips may be mechanically gripped and advanced toward the subsequent stations 3 and 4.

Advancing of the pair of strips 1 takes place in steps in the direction of the arrow F while the shells 2a, 3a and 4a are open. It is preferred that the extension of the heating station 2 in the direction of the arrow F is at least twice, preferably thrice, the extension of each of the stations 3 and 4. Thus, the pair of strips 1 remains in the heating station 2 for a time interval which is about double, or triple, that of each of the subsequent phases. This allows the pair of strips 1 to be heated more progressively and more uniformly.

It is particularly advantageous if both the inflating fluid injected by the injectors 15 and the operating fluid injected through the conduits 14 are constituted by compressed air provided at the same pressure. In that case, in order to ensure closing of the pair of shells 2a, the effective surface area of the membrane 11 must be at least equal to the effective surface area of the portions of the pair of strips 1 which are to be heated.

If the pressure of the inflating fluid is less than the pressure of the operating fluid, the effective surface area of the membrane 11 can be less than the effective surface area of the surface 5b.

In an alternative embodiment (not shown) the driving means could comprise a pneumatic piston-and-cylinder device. The piston could be provided, in effect, by the outer part of the plate 7, and the cylinder be provided, in effect, by the frame 13, with one or more suitable gaskets being interposed between the cylinder and the piston.

Moreover, the strips 1 can be derived from a single web folded longitudinally.

What is claimed is:

1. Apparatus comprising first fluid supplying means (15) for supplying inflating fluid to between opposite portions (1) of thermoformable material, first and second parts (2a; 3a; 4a) for receiving said portions (1) between them, one of the parts (2a; 3a; 4a) being in the form of a shell, said shell (2a; 3a; 4a) defining a recess (2b; 3b; 4b) having a surface (5a) against which said inflating fluid presses one of said opposite portions (1), driving means (11, 13) operable to translate the shell towards the other part, with said portions (1) between the first and second parts (2a; 3a; 4a), to bring the shell into a closed condition relative to the other part and to maintain the shell in said closed condition against the inflating pressure of the inflating fluid, and second fluid supplying means (14) arranged to supply operating fluid to said driving means (11, 13), characterized in that the driving means (11, 13) and the second fluid supplying means are pneumatic.

2. Apparatus comprising first fluid supplying means (15) for supplying inflating fluid to between opposite portions (1) of thermoformable material, first and second parts (2a; 3a; 4a) for receiving said portions (1) between them, one of the parts (2a; 3a; 4a) being in the form of a shell, said shell defining a recess (2b; 3b; 4b) having a surface (5a) against which said inflating fluid presses one of said opposite portions (1), driving means (11, 13, 22) operable to translate the shell towards the other part, with said portions (1) between the first and second parts (2a; 3a; 4a), to bring the shell into a closed condition relative to the other part and to maintain the shell in said closed condition against the inflating pressure of the inflating fluid, said driving means (11, 13, 22) including an operating chamber (22) having an operating surface (11), and second fluid supplying means (14) arranged to supply operating fluid to said operating chamber (22) to translate said operating surface (11) and thus said shell towards said other part, characterized in that the projected areas of said surface (5a) of said recess (2b; 3b; 4b) and of said operating surface (11) are of substantially the same size as each other.

3. Apparatus according to claim 2, wherein the driving means (11, 13, 22) and the second fluid supplying means (14) are pneumatic.

4. Apparatus according to claim 2 or 3, characterized in that said projected areas are substantially coincident with each other.

5. Apparatus according to claim 1, and further comprising strip supplying means for supplying strips (1) of thermoformable material to provide said opposite portions.

6. Apparatus according to claim 1, and further comprising temperature varying means (5a, 6a) thermally coupled with said first and second parts (2a, 3a, 4a).

7. Apparatus according to claim 6, wherein said shell comprises a heating plate (5) coupled with heating means (5a) of said temperature varying means (5a, 6a) and a frame (6) peripherally surrounding said plate (5) and coupled with cooling means (6a) of said temperature varying means (5a, 6a).

8. Apparatus according to claim 7, wherein said frame (6) is connected to a driving plate (7) of said shell and bounds a hollow (10) in which said heating plate (5) is received.

9. Apparatus according to claim 8, wherein spacing means (8) of said shell is interposed between said driving plate (7) and said heating plate (5).

10. Apparatus according to claim 6, wherein said shell comprises a heating plate (5) coupled with heating means (5a) of said temperature varying means (5a, 6a) and a frame (6) peripherally surrounding said plate (5) and coupled with cooling means (6a) of said temperature varying means (5a, 6a), and wherein said frame (6) is provided with notches (16) for the supply of said inflating fluid to said recess.

11. Apparatus according to claim 7, wherein said frame (6) is connected to a driving plate (7) of said shell and bounds a hollow (10) in which said heating plate (5) is received, and wherein said frame (6) is proved with notches (16) for the supply of said inflating fluid to said recess.

12. Apparatus according to claim 8, wherein spacing means (8) of said shell is interposed between said driving plate (7) and said heating plate (5), and wherein said frame (6) is provided with notches (16) for the supply of said inflating fluid to said recess.

13. Apparatus according to any one of claims 10 to 12, wherein said notches (16) are arranged to receive respective injection means (15) for said inflating fluid.

14. Apparatus according to claim 7, wherein said recess (2b, 3b, 4b) is formed in said heating plate (95) and the whole of said heating plate (5) is set back in said frame (6).

15. Apparatus according to claim 1, wherein said first and second parts (2a) are at a first station (2) of a plurality of stations (2–4) of said apparatus.

16. Apparatus according to claim 15, wherein shall shell comprises a heating plate (5) coupled with heating means (5a) of temperature varying means (5a, 6a), said temperature varying means (5a, 6a) being thermally coupled with said first and second parts (2a, 3a, 4a), and further comprises a frame (6) peripherally surrounding said plate (5) and coupled with cooling means (6a) of said temperature varying means (5a, 6a), and wherein said frame (6) is provided with notches (16) for the supply of said inflating fluid to said recess, said notches (16) being in communication with corresponding notches (20) of a second station (3) of said stations (2–4) to enable said inflating fluid to pass from said first station (2) to said second station (3).

17. Apparatus according to claim 15 or 16, wherein said first station (2) extends longitudinally at least substantially twice the longitudinal extension of the second station (3).

18. Apparatus according to claim 1, wherein said driving means (11, 14, 22) comprises a membrane (11) centrally coupled with said shell, said membrane (11) being peripherally fixed to a support (12) by fixing means (13).

19. Apparatus according to claim 18, wherein said support (12) is provided with conduit means (14) through which said operating fluid is supplied.

20. A method comprising providing first and second parts (2a; 3a; 4a) one of which is in the form of a shell, supplying operating fluid to driving means (11, 14) to operate said driving means (11, 14) to translate the shell towards the other part, with opposite portions (1) of thermoformable material being received between the first and second parts (2a; 3a; 4a), to bring the shell into a closed condition relative to the other part, and supplying an inflating fluid to between said opposite portions (1) to inflate said opposite portions (1) while said driving means (11, 14) serves to maintain said shell in said closed condition, characterized in that the operating of said driving means (11, 14) to bring the shell into said closed condition and to maintain the shell in said closed condition is pneumatic.

21. A method according to claim 20, and further comprising varying the temperatures of said first and second parts (2a; 3a; 4a).

22. A method according to claim 20 or 21, characterized in that said opposite portions (1) are of respective strips of thermoformable material.

23. A method according to claim 22, comprising indexing said strips (1) through between said first and second parts (2a; 3a; 4a), the longitudinal extension of a recess (2b; 3b; 4b) defined by said shell and into which said inflating fluid presses one of said opposite portions (1) being equal to at least substantially twice the pitch of said indexing.

24. Apparatus according to claims 18 or 19, wherein guide means (17) is interposed between said support (12) and a support (12) mounting said other part.

25. Apparatus according to claim 1, wherein elastic return means (19) is interposed between said first and second parts (2a, 3a, 4a).

* * * * *

UNITED STATES PATENT AND TRADEMARK OFFICE
CERTIFICATE OF CORRECTION

PATENT NO.    : 6,444,160 B1
DATED         : September 3, 2002
INVENTOR(S)   : Andrea Bartoli It is certified that error appears in the above-identified patent and that said Letters Patent is hereby corrected as shown below:

<u>Column 7,</u>
Line 20, after "wherein" delete "shall" and insert therein -- said --.

Signed and Sealed this

Third Day of June, 2003

JAMES E. ROGAN
*Director of the United States Patent and Trademark Office*